Dec. 20, 1955  A. J. KAYSER  2,727,769
OIL SEALING DEVICES FOR AUTOMOTIVE WHEELS
Filed May 10, 1951
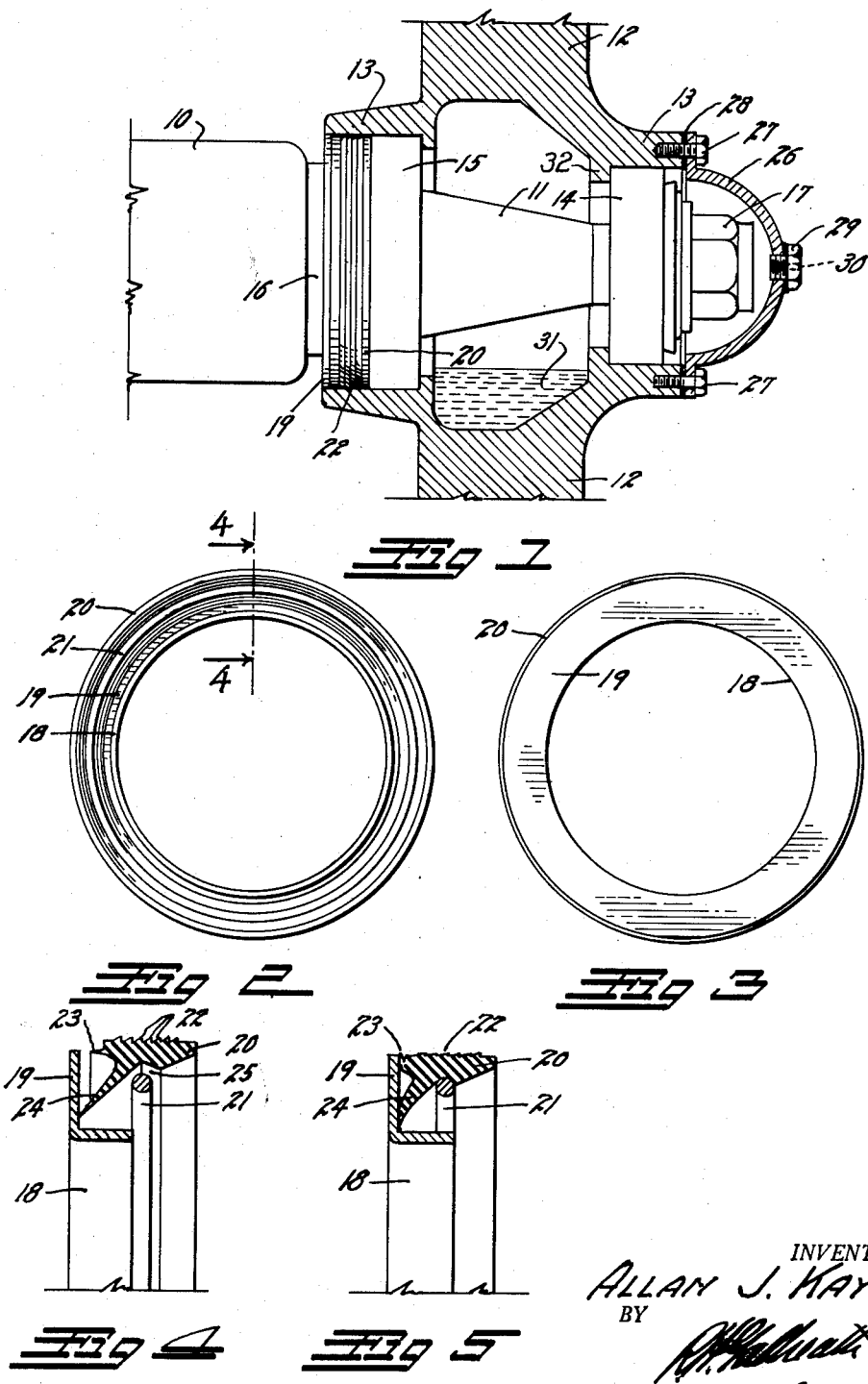
INVENTOR.
ALLAN J. KAYSER
BY
ATTORNEY

United States Patent Office 2,727,769
Patented Dec. 20, 1955

2,727,769

OIL SEALING DEVICES FOR AUTOMOTIVE WHEELS

Allan J. Kayser, Denver, Colo., assignor of fifty per cent to Maurice L. Kurland, forty per cent to Grace K. Israel, and ten per cent to Rosalind L. Kayser, Denver, Colo.

Application May 10, 1951, Serial No. 225,645

1 Claim. (Cl. 288—2)

This invention relates to a wheel sealing device for sealing fluid lubricant in the hub of a rotating wheel, and is designed more particularly as an improvement over the wheel lubricating means illustrated and described in applicant's co-pending application, Serial No. 165,729 now U. S. Patent No. 2,592,645, issued April 15, 1952. The invention is more particularly applicable for use on freely rotating vehicle wheels, such as used on trailers and the like. It is not limited, however, to this particular use, but will be found valuable wherever it is desired to seal fluid lubricant in the hub of a rotating element.

Wheels of the freely rotating type, such as used on trailers and similar vehicles, have been heretofore lubricated with hard oil or axle grease, since it has been found impossible to retain fluid oil therein. Such heavy lubricants are only efficient under warm temperatures, and at sub-zero temperatures act to substantially lock the wheels to the axle. The principal object of this invention is to provide a wheel seal which will enable light fluid oil to be used for wheel lubrication so as to avoid all the disadvantages of the heavy greases, and which will prevent leakage and loss of the oil.

Another object of the invention is to so construct the improved sealing device that it can be applied to the present conventional wheels without change in the construction thereof.

The wheel lubricating means employed in applicant's said prior application employed a rubber ring which was held against the inside of the wheel hub by the natural resiliency of the ring. With this construction difficulty was encountered in preventing leakage between the rubber ring and the wheel hub. A further object of this invention is to provide highly efficient means for effectively holding the rubber ring of the prior application against the wheel hub to prevent leakage therebetween.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is an enlarged, fragmentary, sectional view through a conventional trailer wheel hub, illustrating the invention in place therein;

Fig. 2 is an outer face view of the improved wheel sealing device;

Fig. 3 is an inside face view thereof;

Fig. 4 is an enlarged, radial section through the device of Fig. 2, taken on the line 4—4, Fig. 2, illustrating the elements of the device assembled and ready for installation in a wheel hub; and Fig. 5 is a similar section, illustrating the relative positions of the elements of the device as they would appear when installed in a wheel hub.

In Fig. 1 typical parts of a wheel mounting are designated by numeral as follows: axle 10, axle spindle 11, wheel 12, wheel hub 13, outer anti-friction bearing 14, inner anti-friction bearing 15, bearing stop shoulder 16, wheel retaining nut 17, and outer bearing flange 32. In the usual assembly the inner bearing 15 is placed against the stop shoulder 16, where it is held in place by the wheel hub 13. The outer bearing is then placed in the hub 13 against the outer bearing flange 32, and the outer bearing 14 and the wheel hub are secured in position by means of the retaining nut 17.

The improved wheel sealing device consists of three parts: a metallic spacing ring 18, a resilient sealing ring 20, and a rigid spreading ring 21.

In applying this invention to the wheel, the metallic spacing ring 18 is positioned between the inner bearing 15 and the shoulder 16 and is clamped therebetween by the action of the retaining nut 17. This spaces the entire wheel outwardly on the spindle 11 the width of the spacing ring 18.

The spacing ring 18 has an L-shaped cross-section to provide a cylindrical portion, which closely surrounds the inner bearing seat of the spindle 11, and an annular, flat flange 19 which projects from the inner edge of the ring 18 and lies against the shoulder 16.

The rubber sealing ring has an intricate cross-section which provides a cylindrical external surface with a plurality of spaced-apart, ratchet-like sealing ridges 22 extending thereabout. A relatively thin, flexible, pointed, sealing fin 23 is formed upon the rear edge of the ring 20 and projects therefrom. A relatively sharp, wedge-shaped, flexible, conical sealing skirt 24 projects radially inward and rearwardly from the inner surface of the ring 20. A V-shaped groove 25 is formed in the inner surface of the ring 20 at the base of the skirt 24. The groove 25 is for the purpose of fitting the ring 20 over and about the rigid spreading ring 21.

To install the device, the nut 17 is removed, and the hub 13, with its bearings 14 and 15, is withdrawn from the spindle 11. The spacing ring 18 is then forced into place over the inner bearing seat of the axle spindle 11 and snugly against the shoulder 16. The resilient ring 20 is then placed around the spreading ring 21, and the assembly of the two rings is forced into the hollow bearing bell of the inner hub 13 until it fits snugly against the outer race of the inner bearing 15. The outer diameter of the ring 20 normally exceeds the inner diameter of the hub 13 so that in forcing the ring into the hub, the ring is contracted or compressed radially until it fits snugly against the rigid ring 21 and tightly against the inner surface of the hub, as shown in Fig. 5.

The wheel is now placed in position over the spindle 11 until the inner bearing 15 rests against the cylindrical portion of the spacing ring 18. The outer bearing 14 is now placed in position and the retaining nut 17 is tightened into place. As the nut is tightened, the outer resilient ring 20 is forced against the flange 19 of the spacing ring 18, as shown in Fig. 5. This compresses the fin 23 against the flange 19 and resiliently flexes the annular skirt 24 thereagainst to form a tight seal at this point, as shown in Fig. 5. The fin 23 prevents the entrance of dust and moisture to the bearing, and the skirt 24 prevents leakage of lubricant from the bearing. The ridges 22 are maintained tightly compressed against the inside of the hub 13 by the accurately sized, rigid spreading ring 21.

The ring 20 rotates with the wheel, while the spacing ring 18 remains stationary, so that there is a light, constant friction between the thin terminal edges of the fin 23 and the skirt 24, to maintain a clean, smooth, oil-tight joint. Any oil tending to travel outwardly over the ring 18 will be picked up by the whirling skirt 24 and thrown centrifugally outward away from the joint between the skirt and the flange 19 and into the inner bearing 15 so as to prevent leakage between the flange 19 and the skirt 24.

The hub 13 of the wheel 12 is partially filled with oil, as indicated at 31, and this oil is maintained in the hub by means of a hub cap 26 which is secured in place on the outer hub 13 by means of suitable cap screws 27, there being a sealing gasket 28 positioned between the cap and the hub to prevent leakage therebetween.

A filling plug 29 is threaded into the cap 26 to close an oil-filling opening therein. The plug is provided with a small air bleed hole 30 to allow the passage of air into and out of the hub due to temperature variations therein, so that there will be no pressure therein to force the oil therefrom.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A sealing device comprising: a rigid supporting ring having an L-shaped cross-section to provide a cylindrical portion and a radially outwardly extending flange; a sealing ring of flexible material surrounding the cylindrical portion of said supporting ring and having a greater normal outer diameter than said flange; a V-shaped internal annular groove formed in the inner circumference of said sealing ring; a rigid spreading ring of circular cross-section positioned in said groove and surrounding said cylindrical portion within the confines of said sealing ring, the diameter of said spreading ring being such as to cause said sealing ring to be compressed against said spreading ring when the diameter of said sealing ring is reduced by being forced into a cylindrical member to be sealed, said sealing ring being adapted to be compressed between the member being sealed and the rigid spreading ring; a relatively thin, conical sealing skirt extending inwardly from said sealing ring and flexing radially inward against said flange; and a flexible sealing fin extending from said sealing ring and flexing radially outward against said flange.

References Cited in the file of this patent

UNITED STATES PATENTS

| | | |
|---|---|---|
| 1,983,522 | Coultas | Dec. 11, 1934 |
| 2,415,888 | Joy | Feb. 18, 1947 |
| 2,444,713 | Solari | July 6, 1948 |
| 2,592,645 | Kayser | Apr. 15, 1952 |

FOREIGN PATENTS

| | | |
|---|---|---|
| 703,031 | Germany | of 1941 |